Aug. 19, 1952  J. V. CRAWFORD ET AL  2,607,437
APPARATUS FOR SEPARATING LIQUIDS AND GASES
Filed March 29, 1948  2 SHEETS—SHEET 1
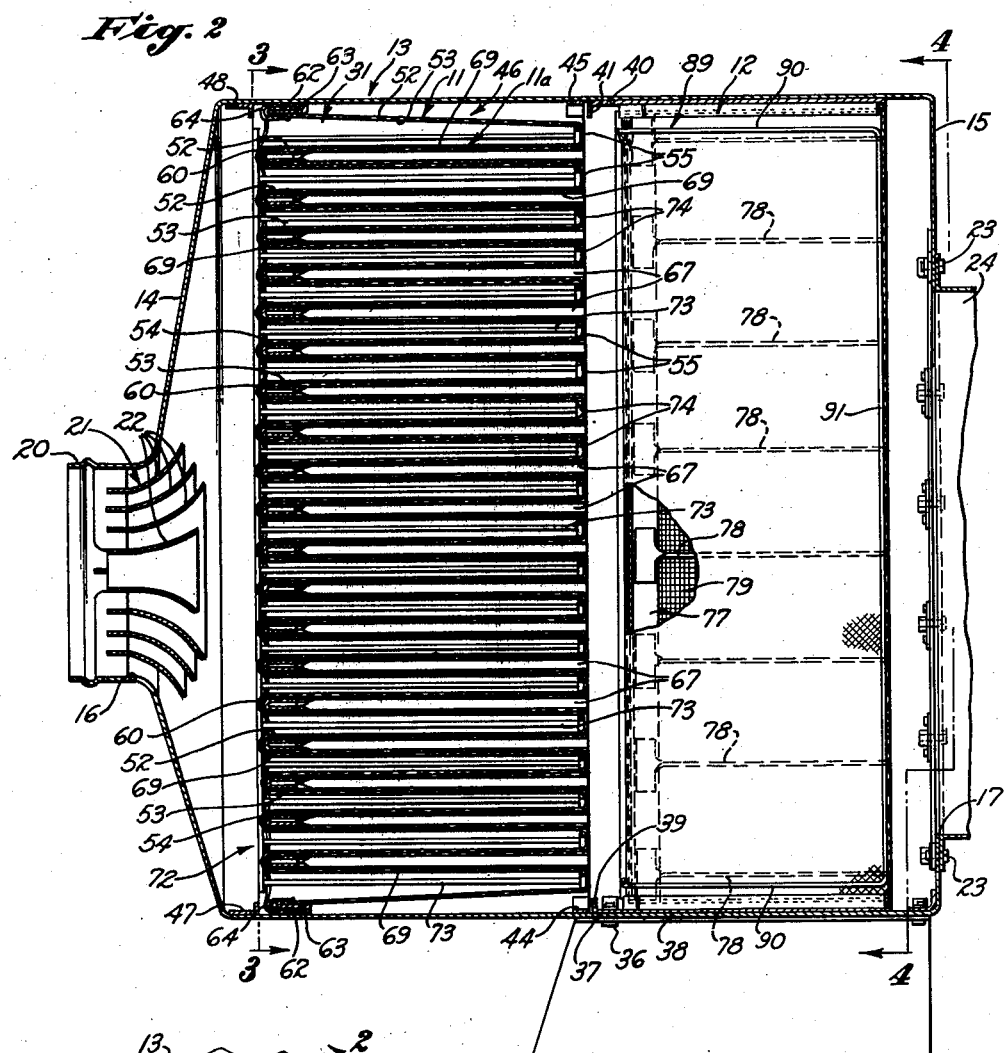
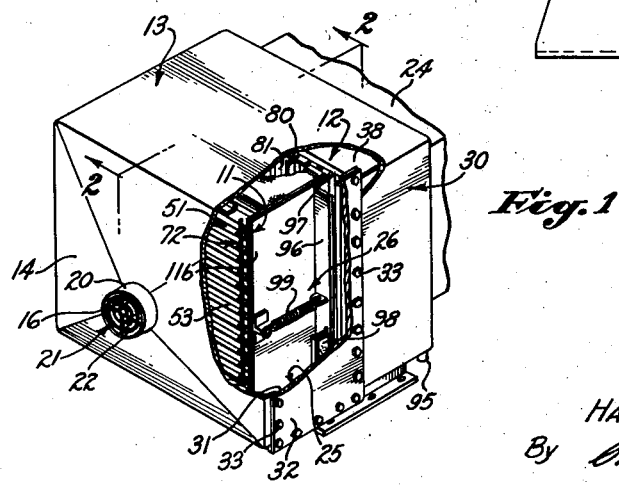
INVENTORS:
JAMES V. CRAWFORD
RAYMOND W. JENSEN
BY THEIR ATTORNEYS
HARRIS, KIECH, FOSTER & HARRIS

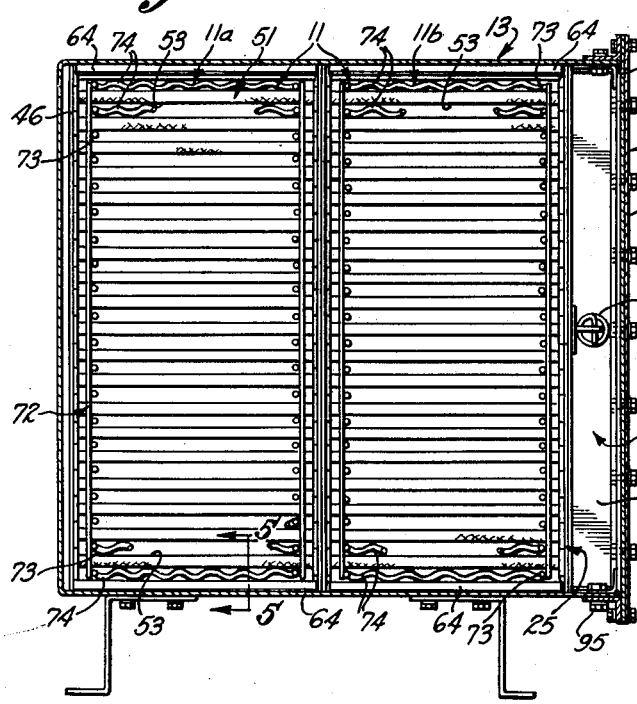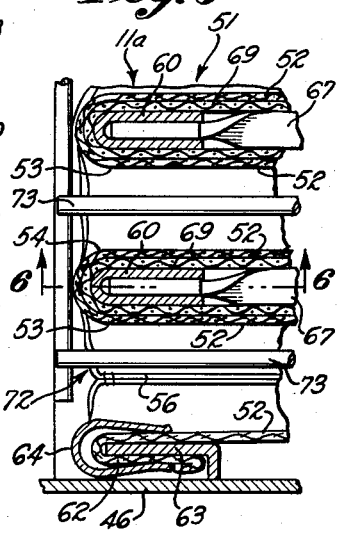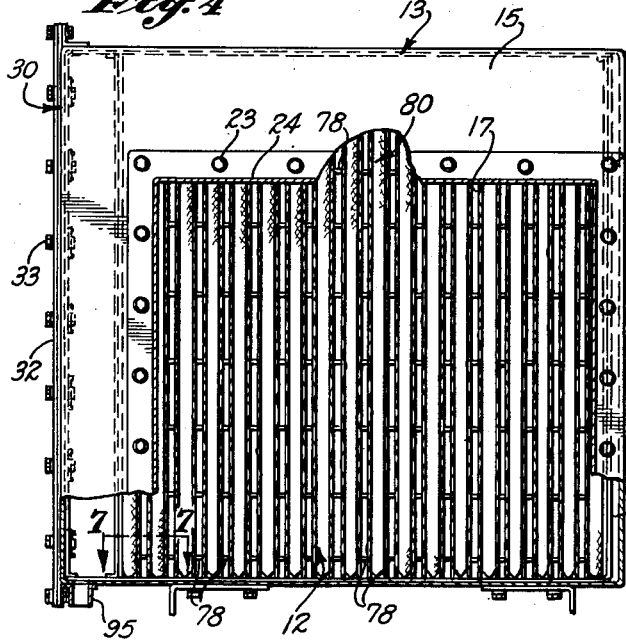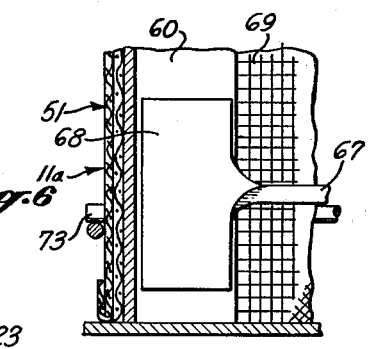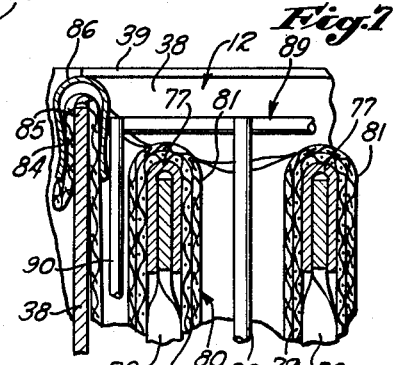
INVENTORS:
JAMES V. CRAWFORD
RAYMOND W. JENSEN
BY THEIR ATTORNEYS
HARRIS, KIECH, FOSTER & HARRIS Patented Aug. 19, 1952

2,607,437

UNITED STATES PATENT OFFICE 2,607,437

APPARATUS FOR SEPARATING LIQUIDS AND GASES

James V. Crawford and Raymond W. Jensen, Los Angeles, Calif., assignors to The Garrett Corporation, Los Angeles, Calif., a corporation of California Application March 29, 1948, Serial No. 17,776

9 Claims. (Cl. 183—71)

Our invention relates in general to apparatus for separating liquids from gases or gaseous fluids and, more particularly, to an apparatus for removing particles of a liquid such as water from a gaseous fluid such as air. Since the invention is of particular utility in air conditioning systems, such as those employed for conditioning the air delivered to aircraft cabins, for example, we prefer to consider such an application of the invention herein for convenience in disclosing same. However, it will be understood that the invention is not to be limited to air conditioning systems since various other applications thereof are possible, as will be apparent to those skilled in the art.

When the ambient temperature is such that the temperature of the air delivered to an aircraft cabin or other chamber must be reduced, it is customary to refrigerate at least a portion of the air supplied to the cabin by compressing it so as to elevate its temperature and pressure substantially above atmospheric, after which the temperature of the compressed air is reduced in a suitable heat exchanger which may utilize ambient air as the cooling medium. Thereafter the compressed air is expanded to a pressure commensurate with that desired in the cabin, the result of such expansion being to reduce the temperature of the air below the ambient temperature. The expansion may take place in an air turbine, for example, which turbine is preferably connected to the compressor so that the work done by the air in expanding may be utilized to offset at least partially the work done upon the air in compressing it.

If the temperature of the air cooled by expansion in the turbine or other device is reduced below the dew point, which is frequently the case, some of the water vapor in the air condenses to form exceedingly fine, discrete droplets which appear as a light fog in the air stream emanating from the turbine. Since the quantity of condensate formed in this manner is frequently excessive, it may be necessary to remove at least a portion of such condensate from the air entering the cabin in order to attain proper control of the humidity of the air in the cabin. This is desirable both from the standpoint of passenger comfort and from the standpoint of preventing deterioration of the equipment and furnishings in the cabin through contact of excessively humid air therewith. In cases where close humidity control might be desirable a humidistat may be located within the cabin, or the duct leading thereto, in order to control the mixing of a portion of saturated air as it leaves the turbine with a portion of the air from which the entrained water has been separated. It is also possible to control the humidity by injecting a controlled spray of water into the air before it enters the cabin. Such methods of humidity control are well known in the air conditioning art and form no part of the present invention.

We have found that commercially available types of apparatus for separating liquids from gases will not remove the exceedingly fine condensate droplets produced by expanding compressed air in the foregoing manner to a satisfactory degree and, accordingly, the provision of a separating apparatus which will operate successfully on such fine droplets is a primary object of this invention.

In general, the present invention provides an apparatus for causing the condensate droplets in the air stream emanating from the turbine or other expansion device to coalesce so as to form relatively larger drops, and for conveying such larger drops out of the path of the air stream. In this respect, the function of the apparatus of the present invention is similar to that of the apparatus disclosed in prior application Serial No. 769,272, entitled "Gas-Liquid Separator" and filed August 18, 1947, by Soren K. Andersen and Raymond W. Jensen, the latter being co-inventor of the invention disclosed herein. The apparatus of the present invention may, in many instances, be substituted for the apparatus disclosed in said prior application, and may be substituted therefor particularly advantageously when the velocity of the stream from which liquid particles are to be removed is relatively low.

In general, an object of the present invention is to provide an apparatus having fibrous filtering means through which the air or other gaseous fluid is required to flow and which is adapted to collect condensate droplets or other liquid particles entrained therein and convey them from the path of the fluid stream.

An important object is to provide such a filtering means which comprises two or more fibrous condensing elements in series so that the air or other gaseous fluid from which liquid is to be removed is required to pass through the filtering elements in sequence. With this construction, the first filtering element in the series serves to coalesce the fine condensate droplets entrained in the air stream so as to form relatively larger drops, and the second element in the series serves to further coalesce such larger drops.

An important object of the invention is to provide a separating means wherein the second filtering element in the series comprises a vertically homogeneous body of fibrous material which is adapted to conduct the drops collected thereby downwardly out of the path of the stream of air or other gaseous fluid.

More specifically, an object of the invention is to provide a separating means wherein the first filtering element comprises a plurality of pockets which extend transversely of the path of the stream in substantially horizontally planes, and wherein the second filtering element comprises a plurality of pockets which extend transversely of the path of the stream in substantially vertical planes. The pockets of the second filtering element are adapted to conduct the drops collected therein downwardly out of the path of the stream. The pockets in the two filtering elements are open at their upstream ends and closed at their downstream ends so that the air or other gaseous fluid from which entrained liquid particles are to be removed is required to pass through the fibrous material forming the walls of the pockets. When the air having condensate droplets entrained therein is required to flow through the fibrous walls defining the pockets of the filtering elements in this manner, the fibrous material forces the fine condensate droplets entrained in the air to combine with each other within the interstices of the fibrous material, which is an important feature of the invention. Ultimately, the larger drops produced by coalescence of the fine condensate droplets in the first filtering element in the series will be ejected from this element by the air passing therethrough and will be collected and conducted downwardly out of the path of the air stream by the second filtering element in the series.

A further object of the invention is to provide an improved means for supporing the fibrous walls forming the pockets of the filtering elements.

Another object of the invention is to provide a separating apparatus having by-pass means for diverting the air stream around the filtering elements in the event that flow through the latter is interrupted for any reason, as by the formation of ice therein due to cooling of the air and the condensate droplets entrained therein below 32° F. in the expansion device. Thus, the by-pass means prevents a shut-down of, or damage to, the air conditioning system, which is an important feature of the invention.

Still another object is to provide a separating apparatus wherein the filtering elements are incorporated in separating units or cartridges which may be installed in or removed from a housing readily. A related object is to provide such an apparatus wherein the housing and one of the filtering elements are provided with cooperating means thereon for securing the other filtering element in the housing.

The foregoing objects of our invention and the advantages suggested thereby, together with various other objects and advantages which will be evident hereinafter, may be realized through the employment of the exemplary embodiment which is illustrated in the accompanying drawings and which is described in detail hereinafter. Referring to the drawings, which are for illustrative purposes:

Fig. 1 is a perspective view on a reduced scale of a separating apparatus which embodies the invention, part of the housing of the apparatus being broken away to reveal the condensing units therein;

Fig. 2 is a vertical sectional view taken as indicated by the arrows intersecting the broken line 2—2 of Fig. 1;

Fig. 3 is a sectional view taken along the broken line 3—3 of Fig. 2 and showing the first condensing unit in the series;

Fig. 4 is a sectional view taken along the broken line 4—4 of Fig. 2 and showing the second condensing unit in the series;

Fig. 5 is an enlarged, fragmentary sectional view taken along the broken line 5—5 of Fig. 3 and showing details of the first condensing unit;

Fig. 6 is an enlarged, fragmentary sectional view taken along the broken line 6—6 of Fig. 5; and Fig. 7 is an enlarged, fragmentary sectional view taken along the broken line 7—7 of Fig. 4 and showing details of the second condensing unit.

Referring particularly to Figs. 1 and 2 of the drawings, the separating apparatus includes, in general, two separating or coalescing units 11 and 12 in series, the first unit 11 being formed in two parts 11a and 11b in the particular construction illustrated, as best shown in Fig. 3 of the drawings. The separating units 11 and 12 are enclosed by a housing 13 which serves as a conduit for a stream of air or other gaseous fluid from which entrained liquid particles are to be removed. The housing has a box-like configuration in the particular construction illustrated in the drawings. End walls 14 and 15 of the housing 13 are provided with openings 16 and 17, respectively, which serve as an inlet and an outlet, respectively, for the stream of gaseous fluid. As best shown in Fig. 2 of the drawings, the end wall 14 of the housing 13 is provided with a tubular extension 20 which encircles the inlet 16 and which carries diffusing means 21. The diffusing means comprises a plurality of concentric, generally bell-shaped diffusing members 22 which diverge from the inlet. The function of the diffusing means 21 is to spread the gaseous fluid entering the housing 13 through the inlet 16 substantially uniformly throughout the interior of the housing. Connected to the wall 15 of the housing 13, as by bolts 23, is an outlet duct 24 which registers with the outlet 17. The flow of fluid through the housing is from the inlet 16 through the separating units 11 and 12 to the outlet 17 as will be discussed in more detail hereinafter.

The separating units 11 and 12 are positioned in the housing 13 at one side thereof to provide a passage 25, best shown in Figs. 1 and 3 of the drawings, which by-passes the units, pressure responsive valve means 26 being disposed in this passage. As will be discussed in more detail hereinafter, the valve means 26 normally closes the passage 25 but is adapted to open the passage whenever the pressure upstream therefrom exceeds a predetermined maximum value so as to permit diversion of the gaseous fluid flowing through the apparatus around the separating units 11 and 12.

As previously indicated, the separating apparatus is of particular utility when installed in an air conditioning system for the purpose of removing entrained condensate droplets from air emanating from a turbine or other expansion device, although the apparatus is not limited to such use, as will readily be understood by those skilled in the art. Assuming that the apparatus is to be used in connection with an air conditioning system, the inlet 16 may be connected to an expansion device such as an air turbine (not shown), as by a duct (not shown) connected at one end to the tubular extension 20 surrounding the inlet. The outlet duct 24 may lead to an aircraft cabin or other chamber which is to be supplied with conditioned air.

Considering the separating apparatus in more detail, the housing 13, as previously indicated, is provided with a box-like configuration in the particular construction illustrated, the reason for this being that the apparatus was designed for installation in a particular type of aircraft wherein the space available necessitated such a housing configuration. It will be understood, however, that any desired configuration for the housing 13 may be employed. As best shown in Figs. 1 and 3 of the drawings, one side wall 30 of the housing 13 is provided with an opening 31 therein through which the separating units 11 and 12 may be inserted for installation in the housing. This opening is normally closed by a cover plate or panel 32 which may be secured to the housing by bolts 33 or the like. When installing the separating units 11 and 12, the second condensing unit 12 is inserted into the housing 13 through the opening 31 and then moved rearwardly toward the outlet 17 into its proper position. As best shown in Fig. 2 of the drawings, the separating unit 12 may be secured in the housing 13 by means of bolts 36, or the like, extending through a flange 37 on a casing 38 of the unit 12, the flange 37 terminating in a lip 39 which extends inwardly of the housing 13. The casing 38 of the separating unit 12 is provided with a second flange 40 which is spaced from and substantially parallel to the flange 37, the flange 40 also having a lip 41 thereon which extends inwardly of the housing 13.

After the second separating unit 12 has been secured in the housing 13 in the foregoing manner, the two parts 11a and 11b of the separating unit 11 are inserted into the housing through the opening 31 in the order specified. As best shown in Fig. 2 of the drawings, straps 44 and 45 on the downstream side of a casing 46 of the part 11a of the separating unit 11 are adapted to seat against the lips 39 and 41, respectively, of the flanges 37 and 40 on the casing 38 of the separating unit 12. The housing 13 carries angles 47 and 48 which are adapted to engage the casing 46 of the part 11a of the separating unit 11 on the upstream side thereof so that the part 11a of the unit 11 is secured in the housing 13 between the angles 47, 48 and the lips 39, 41 on the flanges 37, 40. The part 11b of the separating unit 11 is identical to the part 11a thereof and is secured in the housing 13 in a similar manner.

Thus, the lips 39 and 41 of the flanges 37 and 40 on the casing 38 of the separating unit 12 and the angles 47 and 48 carried by the housing 13 serve as cooperating means on the unit 12 and the housing 13 for securing the parts 11a and 11b of the unit 11 in the housing. It will be apparent that, with this construction, the units 11 and 12 may be installed in or removed from the housing 13 readily, which is a feature of the invention.

Considering the separating units 11 and 12 in more detail, since the two parts 11a and 11b of the unit 11 are identical as previously indicated, only the part 11a will be discussed in detail. Referring particularly to Figs. 2 and 3 of the drawings, the part 11a of the separating unit 11 includes a fibrous filtering element, indicated generally by the numeral 51, which is disposed in the casing 46. The filtering element comprises fibrous walls 52 which are so connected as to form a plurality of pockets 53 which extend horizontally across the housing 13. The pockets 53 are open at their upstream ends 54 and are closed at their downstream ends 55, as best shown in Fig. 2 of the drawings. Preferably, the pockets 53 are formed by a continuous, pleated sheet of fibrous material, glass cloth having been found to be particularly suitable although other fibrous materials may also be employed. The edges of the sheet forming the filtering element 51 are sewed or otherwise connected, as indicated by the numeral 56 in Fig. 5 of the drawings, to close the sides of the pockets 53 so that all air entering the open ends 54 thereof is required to flow through the fibrous material forming the walls of the pockets. Any entrained particles of water or other liquid are caused to coalesce by the fibrous material, as will be discussed in more detail hereinafter.

The fibrous sheet forming the filtering element 51 is supported in the casing 46 in a manner about to be described. As best shown in Figs. 2 and 5 of the drawings, the casing 46 carries a grid comprising a plurality of horizontal bars 60 each of which is disposed between adjacent ones of the pockets 53 at the upstream ends 54 thereof, the bars preferably being substantially U-shaped. The ends 62 of the sheet are folded around flanges 63 on the casing 46, as best shown in Figs. 2 and 5 of the drawings, and are secured by U-shaped clips 64 slipped thereover. Thus, the bars 60 and the flanges 63 carried by the casing 46 anchor the filtering element 51 against downstream movement.

Each of the bars 60 carries a plurality of fingers 67 which extend horizontally in the downstream direction. As best shown in Fig. 6 of the drawings, each finger 67 is provided with a head 68 in the form of a flat plate which is inserted between the arms of the corresponding U-shaped bar 60 and is suitably secured thereto. Each of the bars 60 and the fingers 67 thereon are enclosed by a generally U-shaped, foraminous member 69 which is provided with downstream extending arms, as best shown in Figs. 2 and 5. The members 69 are slipped over the respective bars 60 and the fingers 67 thereon from the upstream side of the filtering element. Preferably, the foraminous members 69 comprise substantially U-shaped pieces of wire screen, although other materials may be employed.

The bars 60 and fingers 67 thereon support the foraminous members 69 and the latter serve to separate the walls of the pockets 53 of the filtering element 51. Thus, flow through the filtering element with a minimum of resistance is insured.

The pockets 53 are held open by distending means comprising a frame 72 having a plurality of generally U-shaped distending members 73 which are disposed in the respective pockets 53. The distending frame 72 connects the distending members 73 so that all such members may be inserted into the corresponding pockets 53 simultaneously during assembly, which is a feature of the invention. As best shown in Fig. 3 of the drawings, the U-shaped distending members 73 are provided with zig-zag base portions 74 which engage the closed ends 55 of the pockets 53 to assist in distending the pockets.

The foregoing completes the detailed description of the part 11a of the first separator unit 11 in the series and, since the part 11b thereof is identical to the part 11a, the part 11b will not be described in detail. Insofar as structural details are concerned, the separating unit 12 is substantially identical to one of the parts of the unit 11 so that only a general description thereof is necessary herein. The principal differences between the separating units 11 and 12 are that the area of the unit 12 considered in a plane transverse to the direction of flow through the apparatus, is substantially equal to the combined areas of the two parts of the unit 11, and that the pockets of the filtering element of the unit 12 extend vertically whereas the pockets in the filtering elements of the two parts of the unit 11 extend horizontally. The importance of this relationship between the positions of the pockets of the filtering elements of the two units will be pointed out more specifically hereinafter.

Considering the general structure of the separating unit 12, it includes a plurality of substantially U-shaped bars 77 which extend vertically across and are carried by the casing 38 adjacent the upstream side thereof. The bars 77 carry downstream-extending fingers 78, all as best shown in Figs. 2 and 7 of the drawings. Each bar 77 and the fingers 78 thereon are enclosed by a foraminous member 79 which corresponds to one of the previously discussed foraminous members 69 and which performs a similar function. The separating unit 12 includes a filtering element 80 formed of fibrous material and provided with a plurality of pockets 81 which are closed at their sides and downstream ends and which are open at their upstream ends, the pockets 81 extending vertically. The foraminous members 79 enclosing the respective bars 77 and the fingers 78 thereon are received between the pockets 81 of the filtering element 80, as best shown in Fig. 7 of the drawings. As is the case with the filtering element 51, the condensing element 80 is preferably formed of a pleated sheet of fibrous material, the ends of this sheet being folded over portions of the casing 38 and being secured by clips, or the like. The manner in which the ends of the sheet forming the filtering element 80 are secured is illustrated in Fig. 7 of the drawings wherein one end 84 of the sheet is shown folded over a portion 85 of the casing 38 and secured by a U-shaped clip 86 slipped thereover. Thus, the bars 77 and the portions of the casing 38 over which the ends of the sheet forming the filtering element 80 are folded anchor the condensing element 80 against downstream movement.

The pockets 81 of the filtering element 80 are distended by a frame 89 which is substantially identical to the previously described distending frame 72. The frame 89 has a plurality of generally U-shaped distending members 90 which are adapted to be inserted in the respective pockets 81 of the filtering element 80. The members 90 are provided with zig-zag base portions 91 engaging and distending the closed ends of the pockets.

Considering the operation of the separating apparatus as thus far described, as a stream of air or other gaseous fluid from which entrained liquid particles are to be removed flows into the housing 13 through the inlet 16, it is distributed substantially uniformly throughout the housing by the diffusing means 21. Subsequently, the air flows into the horizontal pockets 53 in the filtering elements incorporated in the parts 11a and 11b of the separating unit 11 and flows through the fibrous material forming the walls and/or downstream ends of the pockets. The fibrous material collects the fine condensate droplets entrained in the air flowing therethrough and causes each droplet to combine with others so as to form relatively larger drops. As previously indicated, we have found that a fibrous material such as glass cloth may be employed advantageously, although other materials may be used without necessarily departing from the spirit of the invention.

After moisture laden air has passed through the separating unit 11 for some time, the fibrous material therein becomes saturated so that the moisture begins to escape in the form of relatively large drops which are carried downstream toward the separating unit 12. Some of the moisture collected by the separating unit 11 may also drop downwardly onto the lower wall of the housing 13.

The drops of water carried into the separating unit 12 are intercepted by the fibrous material forming the filtering element 80 as the air enters and flows through the walls and/or downstream ends of the pockets 81 therein. Since the pockets 81 of the filtering element 80 are vertical, the water collected by the element 80 flows downwardly in the pockets out of the path of the airstream. Such water may drain downwardly along the surfaces of the pockets, or may drain downwardly along various components of the supporting structure for the filtering element. Eventually, substantially all of the liquid particles entrained in the air stream entering the separating unit 12 drain downwardly to the lower wall of the housing 13 and escape through a drain 95 adjacent the unit 12. A drain line (not shown) leading to some suitable point of discharge, such as the exterior of an aircraft in which the separating apparatus is installed, may be employed to dispose of the water removed from the airstream flowing through the apparatus.

Thus, it will be apparent that the function of the first separating unit 11 in the series is to cause the fine condensate droplets entrained in the air to coalesce so as to form relatively larger drops which are subsequently intercepted by the separating unit 12. The function of the unit 12 is to collect the drops emanating from the unit 11 and to convey them downwardly out of the path of the airstream to the drain 95. Because of the fact that the pockets 53 of the filtering elements incorporated in the parts 11a and 11b of the separating unit 11 are horizontal, a large portion of the condensate droplets coalescing therein will be carried to the separating unit 12 by the airstream. Since the pockets 81 of the filtering element 80 in the unit 12 extend vertically, the moisture collected by this unit is conducted downwardly out of the path of the airstream, which is an important feature of the invention. Thus, in effect, the unit 11 serves as a preliminary filtering or coalescing means and the unit 12 serves as a final filtering or coalescing means and as an eliminating means.

As indicated previously, the function of the valve means 26 in the passage 25 by-passing the separating units 11 and 12 is to divert the airstream around the separating units in the event that flow therethrough is prevented by the formation of ice, for example. Ice may form in the separating units 11 and 12 if the air is cooled to a temperature substantially below 32° F. during expansion, which may occur occasionally under operating conditions encountered by air conditioning systems installed in air craft. For example, in order to maintain the air in the cabin of an airplane at a comfortable temperature while the airplane is awaiting clearance for take-off on an unusually hot day, it may be necessary to cool the air supplied to the cabin to a much greater extent than would normally be the case. If such conditions obtain for an extended period of time, sufficient ice may form in the separating units 11 and 12 to greatly restrict or even prevent flow therethrough. The function of the valve means 26, which will now be described in detail, is to permit the air to flow around the separating units 11 and 12 through the passage 25 when such conditions obtain so as to prevent damage to the air conditioning system and so as to provide an uninterrupted supply of cooled air to the cabin. It will be noted that although the humidity of the air supplied to the cabin under such circumstancees may be higher than desirable, this is but a temporary condition.

As best shown in Figs. 1 and 3 of the drawings, the valve means 26 comprises a flap valve 96 which is pivotally connected to the casing of the part 11b of the separating unit 11 by a pivot shaft 97. The valve 96 is adapted to seat against a sealing strip 98 carried by the cover plate 32 so as to close the passage 25. The valve 96 is normally biased toward its closed position wherein it engages the sealing strip 98 by a tension spring 99 connected at one end to the valve and at its other end to the casing of the part 11b of the separating unit 11.

Under normal operating conditions, i. e., when no ice or other material tending to restrict the flow of air through the separating units 11 and 12 is present therein, the spring 99 holds the valve 96 closed so that substantially no air is diverted around said units through the passage 25. If flow through the separating units 11 and 12 is restricted to a predetermined extent, as by the formation of ice therein, the pressure upstream therefrom will increase. This increase in pressure causes the valve 96 to open in opposition to the action of the spring 99 so as to divert the air around the separating units until conditions permitting flow therethrough again obtain. It will be understood that although the valve 96 is adapted to open in response to an increased pressure upstream, it may be controlled by a thermostat or other suitable device if desired.

Although we have disclosed an exemplary embodiment of our invention herein and have considered this embodiment in connection with a specific application of the invention, it will be understood that we do not intend to be limited thereto since the invention is susceptible of various other applications and since various changes, modifications and substitutions may be incorporated in the embodiment disclosed, all without necessarily departing from the spirit of the invention. Accordingly, we hereby reserve the right to protection commensurate with the full scope of the invention as set forth in the appended claims.

We claim as our invention:

1. In an apparatus of the character described, the combination of: a casing having spaced inlet and outlet ends; a grid disposed in and rigidly connected to said casing intermediate said inlet and outlet ends thereof and comprising a plurality of spaced, substantially parallel bars extending transversely of said casing; a plurality of fingers carried by and extending transversely of each of said bars toward said outlet end of said casing; a filtering element having a plurality of substantially parallel pockets adjacent ones of which receive therebetween one of said bars and said fingers carried thereby, each of said pockets having an open end which faces said inlet end of said casing and having a closed end adjacent said outlet end of said casing; and a plurality of generally U-shaped foraminous members respectively embracing said bars and said fingers carried thereby, said foraminous members being disposed between said respective bars and fingers and said filtering element.

2. In an apparatus of the character described, the combination of: a casing having spaced inlet and outlet ends; a grid disposed in and rigidly connected to said casing intermediate said inlet and outlet ends thereof and comprising a plurality of spaced, substantially parallel bars extending transversely of said casing; a plurality of fingers carried by and extending transversely of each of said bars toward said outlet end of said casing; a filtering element having a plurality of substantially parallel pockets adjacent ones of which receive therebetween one of said bars and said fingers carried thereby, each of said pockets having an open end which faces said inlet end of said casing and having a closed end adjacent said outlet end of said casing; and a removable distending frame comprising a plurality of generally U-shaped distending members disposed in and parallel to said pockets, respectively, of said filtering element.

3. An apparatus as set forth in claim 2 wherein each of said distending members includes a zig-zag base portion, said base portions of said distending members extending longitudinally of and bearing against the inner faces of said closed end of said pockets of said filtering element.

4. In an apparatus of the character described, the combination of: a housing having axially spaced inlet and outlet ends, said housing having an access opening in one side thereof adjacent one of said ends thereof and being provided with flanges extending thereinto adjacent said one end thereof; a separating unit adapted to be inserted into said housing through said access opening and to be moved axially in said housing to a position adjacent the other of said ends thereof, said separating unit having flanges thereon which are spaced from and axially aligned with said flanges on said housing when said separating unit is so positioned, said separating unit including a fibrous filtering element; means for securing said separating unit to said housing; and another separating unit insertable into said housing through said access opening into a position between said flanges on said housing and said flanges on the separating unit first defined so as to be retained by said flanges, said other separating unit including a fibrous filtering element.

5. An apparatus as defined in claim 4 wherein said other separating unit is formed in two parts which are insertable into the space between said flanges on said housing and said flanges on said first-defined separating unit independently of each other.

6. In a gas-liquid separator, the combination of: a housing adapted to be disposed in the line of a conduit for a gaseous fluid having liquid particles entrained therein, said housing having an inlet at one end and an outlet at its other end and having a drain opening in the bottom thereof adjacent said other end thereof; a diffuser in said inlet; a first filtering element of fibrous material in said housing adjacent said inlet and provided with generally horizontally oriented pockets extending crosswise of said housing and having open ends facing said inlet; and a second filtering element of fibrous material in said housing adjacent said outlet and provided with generally vertically oriented pockets extending crosswise of said housing and having open ends facing said inlet, said filtering elements coalescing the liquid particles in the gaseous fluid and said generally vertically oriented pockets in said second filtering element conveying the coalesced liquid particles downwardly toward said drain opening.

7. In a gas-liquid separator, the combination of: a housing adapted to be disposed in the line of a conduit for a gaseous fluid having liquid particles entrained therein, said housing having an inlet at one end and an outlet at its other end and having a drain opening in the bottom thereof adjacent said other end thereof, said housing also having an access opening therein adjacent one of the ends thereof; a first filtering element of fibrous material in said housing adjacent said inlet and provided with generally horizontally oriented pockets extending crosswise of said housing and having open ends facing said inlet; and a second filtering element of fibrous material in said housing adjacent said outlet and provided with generally vertically oriented pockets extending crosswise of said housing and having open ends facing said inlet, said filtering elements coalescing the liquid particles in the gaseous fluid and said generally vertically oriented pockets in said second filtering element conveying the coalesced liquid particles downwardly toward said drain opening, said filtering elements being insertable into and removable from said housing through said access opening.

8. A gas-liquid separator as defined in claim 7 including: a cover for said access opening adapted to be attached to said housing; and a valve pivotally connected to one of said filtering elements and adapted to seat against said cover when said one condensing element and said cover are in place.

9. In a separator: a housing adapted to be disposed in a fluid line, said housing having an inlet at one end and an outlet at the opposite end, said housing also having an access opening therein adjacent one of said ends; a separating unit in said housing; a cover for said access opening adapted to be attached to said housing; and a valve pivotally connected to said separating unit and adapted to seat against said cover when said separating unit and said cover are in place.

JAMES V. CRAWFORD.
RAYMOND W. JENSEN.

REFERENCES CITED

The following references are of record in the file of this patent:

UNITED STATES PATENTS

| Number | Name | Date |
|---|---|---|
| 1,062,942 | Woods | May 27, 1913 |
| 1,147,463 | Ulrica | July 20, 1915 |
| 1,506,967 | Bosworth | Sept. 2, 1924 |
| 1,725,474 | Parker | Aug. 20, 1929 |
| 1,739,093 | Ruby | Dec. 10, 1929 |
| 1,779,458 | Annis | Oct. 28, 1930 |
| 2,020,120 | Leathers | Nov. 5, 1935 |
| 2,050,508 | Strindberg | Aug. 11, 1936 |
| 2,394,208 | Schaaf | Feb. 5, 1946 |
| 2,405,293 | Dahlman | Aug. 6, 1946 |
| 2,405,716 | Schaaf | Aug. 13, 1946 |